United States Patent [19]

Dennis

[11] E Patent Number: Re. 32,036

[45] Reissued Date of Patent: Nov. 26, 1985

[54] DRILL BIT

[75] Inventor: Mahlon Dennis, Kingwood, Tex.

[73] Assignee: Strata Bit Corporation, Houston, Tex.

[21] Appl. No.: 595,269

[22] Filed: Mar. 30, 1984

Related U.S. Patent Documents

Reissue of:

[64] Patent No.: 4,323,130
Issued: Apr. 6, 1982
Appl. No.: 158,389
Filed: Jun. 11, 1980

[51] Int. Cl.[4] ..... E21B 10/46

[52] U.S. Cl. ..... 175/329; 175/410

[58] Field of Search ..... 175/393, 330, 329, 410, 175/422; 407/16, 324, 379; 285/404

[56] References Cited

U.S. PATENT DOCUMENTS

| | | | |
|---|---|---|---|
| 3,112,803 | 12/1963 | Rowley | 175/329 |
| 3,220,754 | 11/1965 | Mori | 285/404 |
| 3,788,409 | 1/1974 | Currington | 175/410 |
| 4,176,725 | 12/1979 | Shields | 175/410 X |
| 4,199,035 | 4/1980 | Thompson | 175/410 |
| 4,200,159 | 4/1980 | Reschel et al. | 175/329 |
| 4,244,432 | 1/1981 | Rowley et al. | 175/329 |
| 4,246,977 | 1/1981 | Allen | 175/329 |

*Primary Examiner*—Stephen J. Novosad
*Assistant Examiner*—Thuy M. Bui
*Attorney, Agent, or Firm*—Burns, Doane, Swecker & Mathis

[57] ABSTRACT

A new and improved drill bit for connection on a drill string has a hollow tubular body with an end cutting face and an exterior peripheral stabilizer surface with cylindrical sintered carbide inserts positioned therein. Nozzle passages extend from the interior of the bit body through the cutting face, preferably at an angle of about 10°-25° relative to the longitudinal axis of the body, and consist of a passage in the bit body and a removable and interchangeable nozzle member. The nozzle member is secured in place either by peripheral grooves and snap rings or aligned smaller passages in the nozzle member and the bit body having a retaining pin positioned therein. The cutting face preferably has a plurality of recesses therein which receive, by an interference fit, a plurality of cutting elements of the type known as STRATAPAX, consisting of a cylindrical stud having an angular supporting surface with a cutting disc bonded thereon consisting of sintered carbide having a cutting surface of polycrystalline diamond. The studs of the cutting element may have a groove along one side which aligns with a small recess along the side of the cutting element recess to receive a metal pin operable to secure the cutting element in place and against twisting. Additionally, an offset counterbore may be provided at the top of the cutting element recesses which provide for stress relief of the cutting elements during cutting operation.

18 Claims, 11 Drawing Figures

DRILL BIT

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to new and useful improvements in diamond drill bits and more particularly to certain improved features thereof.

2. Brief Description of the Prior Art

It is well known to use diamond bits for earth drilling using natural or synthetic diamonds bonded to supporting metallic or carbide studs or slugs.

There are several types of diamond bits know to the drilling industry. In one type, the diamonds are a very small size and randomly distributed in a supporting matrix. Another type contains diamonds of a larger size positioned on the surface of a drill shank in a predetermined pattern. Still another type involves the use of a cutter formed of a polycrystalline diamond supported on a sintered carbide support Some of the most recent publications dealing with diamond bits of advanced design, relavent to this invention, consists of Rowley, et al. U.S. Pat. No. 4,073,354 and Rohde, et al. U.S. Pat. No. 4,098,363. An example of cutting inserts using polycrystalline diamond cutters and an illustration of a drill bit using such cutters, is found in Daniels, et al. U.S. Pat. No. 4,156,329.

The most comprehensive treatment of this subject in the literature is probably the chapter entitled STRATAPAX bits, pages 541–591 in ADVANCED DRILLING TECHNIQUES, by William C. Maurer, The Petroleum Publishing Company, 1421 South Sheridan Road, P.O. Box 1260, Tulsa, Okla., 74101, published in 1980. This reference illustrates and discusses in detail the development of the STRATAPAX diamond cutting elements by General Electric and gives several examples of commercial drill bits and prototypes using such cutting elements.

SUMMARY OF THE INVENTION

One of the objects of this invention is to provide a new and improved drill bit having diamond insert cutters.

Another object is to provide a drill bit having diamond cutting inserts with a novel retaining means therefor.

Another object is to provide an improved drill bit having diamond cutter inserts with a means for stress relief during the cutting operation.

Still another object is to provide an improved drill bit with diamond insert cutters and nozzles extending through the cutting face of the bit at an outwardly directed angle.

Yet another object is to provide a new and improved drill bit having removable and interchangeable nozzles with an improved arrangement for nozzle retention.

Other objects and features of this invention will become apparent from time to time throughout the specification and claims as hereinafter related.

The foregoing objectives are accomplished by a new and improved drill bit as described herein. This new and improved drill bit for connection on a drill string has a hollow tubular body with an end cutting face and an exterior peripheral stabilizer surface with cylindrical sintered carbide inserts positioned therein. Nozzle passages extend from the interior of the bit body through the cutting face, preferably at an angle of about 10°–25° relative to the longitudinal axis of the body, and consist of a passage in the bit body and a removable and interchangeable nozzle member. The nozzle member is secured in place either by peripheral grooves and snap rings or aligned smaller passages in the nozzle member and the bit body having a retaining pin positioned therein.

The cutting face preferably has a plurality of recesses therein which receive, by an interference fit, a plurality of cutting elements of the type known as STRATAPAX, consisting of a cylindrical stud having an angular supporting surface with a cutting disc bonded thereon consisting of sintered carbide having a cutting surface of polycrystalline diamond. The studs of the cutting element may have a groove along one side which aligns with a small recess along the side of the cutting element recess to receive a metal pin operable to secure the cutting element in place and against twisting. Additionally, an offset counterbore may be provided at the top of the cutting element recesses which provide for stress relief of the cutting elements during cutting operation.

DESCRIPTION OF THE PREFERRED EMBODIMENTS

Figure 1:
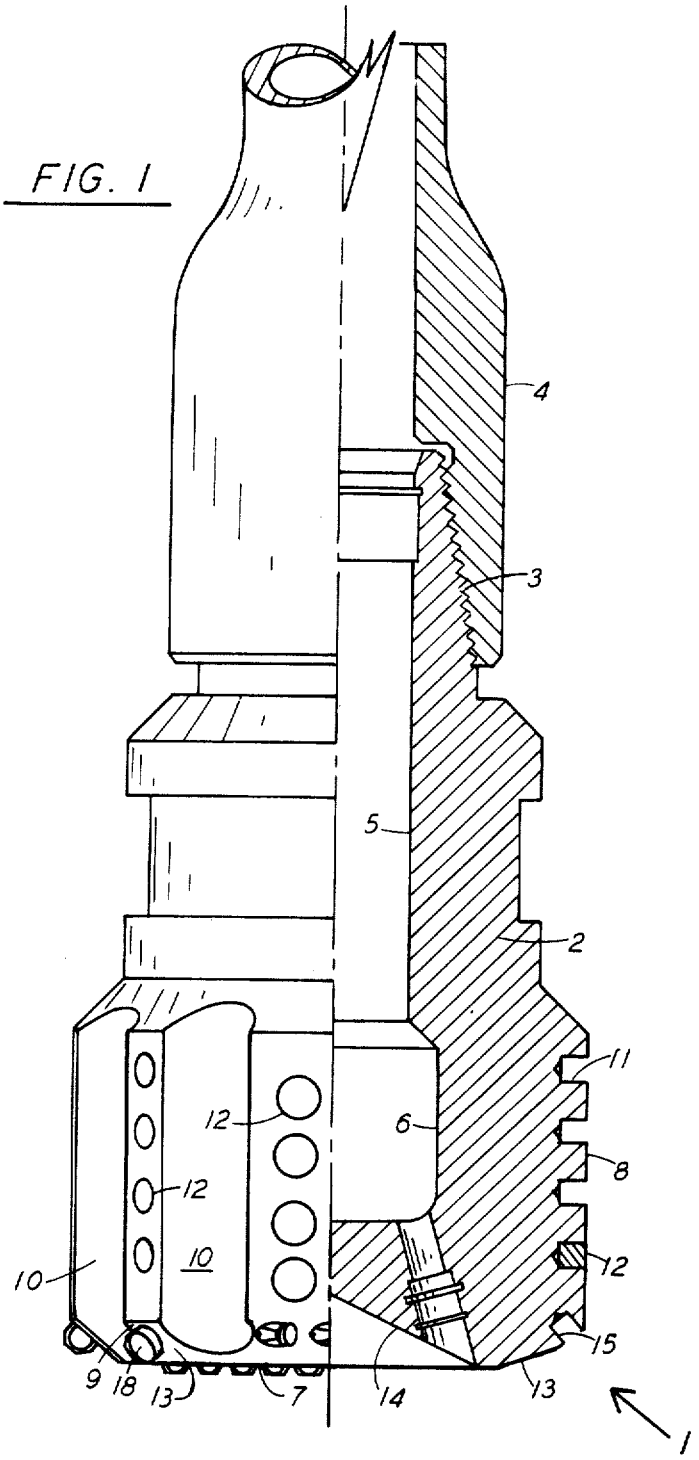
FIG. 1 is a view partly in elevation and partly in quarter section of an earth boring drill bit representing a preferred embodiment of this invention.

Referring to the drawings by numerals of reference and more particularly to FIG. 1, there is shown a drill bit 1 having a tubular body 2 and which is adapted to be connected as by a threaded connection 3 to a drill collar 4 in a conventional drill string. The body 2 of drill bit 1 has a longitudinally extending passage 5 terminating in a cavity 6 formed by end wall 7 which is the cutting face of the drill bit.

Drill bit 1 has a peripheral stabilizer surface 8 which meets the cutting face 7 at the gage cutting edge portion 9.

Figure 3:
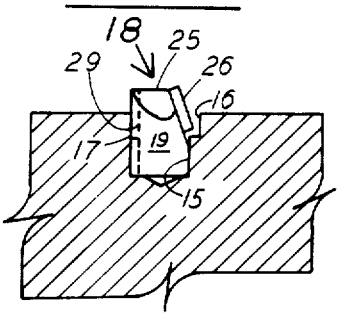
FIG. 3 is a sectional view taken normal to the surface of the drill bit through one of the recesses in which the cutting inserts are positioned and showing the insert in elevation.
Figure 4:
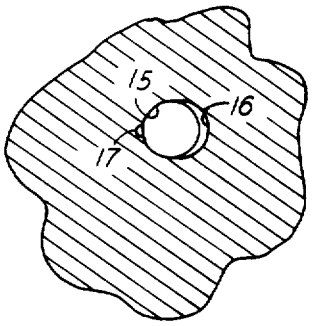
FIG. 4 is a sectional view in plan showing the hole or recess in which the cutting insert is positioned.

The stabilizer portion 8 is provided with a plurality of grooves or courses 10 which provide for flow of drilling mud or other drilling fluid around the bit during drilling operation. The stabilizer surface 8 is provided with a plurality of cylindrical holes or recesses 11 in which are positioned hard metal inserts 12. The hard metal inserts 12 are preferably of a sintered carbide and are cylindrical in shape and held in place in recesses 11 by an interference fit with the flat end of the insert being substantially flush with the stabilizer surface 8. The cutting surface or cutting face 7 of the drill bit body 2 is preferably a crown surface defined by the intersection of outer conical surface 13 and inner negative conical surface 14. The crown surfaces 13 and 14 are provided with a plurality of sockets or recesses 15 spaced therearound in a selected pattern. As will be seen from the bottom plan view in FIG. 2, the sockets or recesses 15 and the cutting inserts which are positioned therein are arranged in substantially a spiral pattern. In FIGS. 3 and 4 the sockets or recesses 15 are shown in more detail with the cutting inserts being illustrated. Each of the recesses 15 is provided with a counterbore 16 extending for only part of the depth of the recess 15. There is also provided a smaller diameter cylindrical recess 17 which intersects the wall of recess 15 and is open thereto. Recess 17 functions to receive a retaining pin as will be subsequently described.

Figure 2:
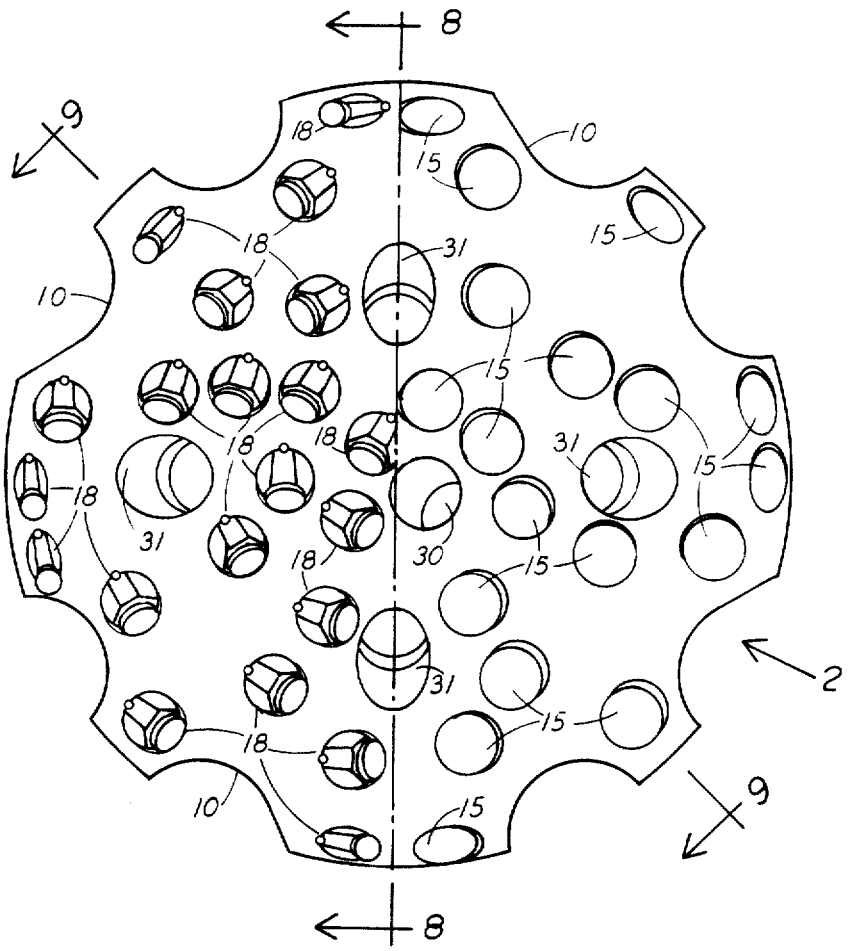
FIG. 2 is a plan view of the bottom of the drill bit shown in FIG. 1 showing half of the bit with cutting inserts in place and half without the inserts, showing only the recesses.
Figure 6:
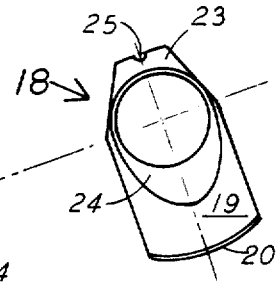
FIG. 6 is a view of one of the cutting inserts in plan relative to the surface on which the cutting element is mounted.

The recesses 15 in crown faces 13 and 14 receive a plurality of cutting elements 18 which are seen in FIGS. 1 and 2 and are shown in substantial detail in FIGS. 3, 5, 6 and 7.

Figure 5:
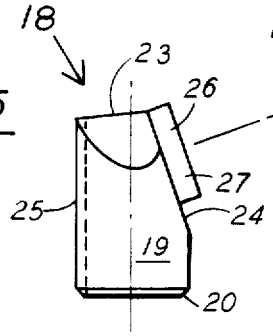
FIG. 5 is a view in side elevation of one of the cutting inserts.
Figure 5A:
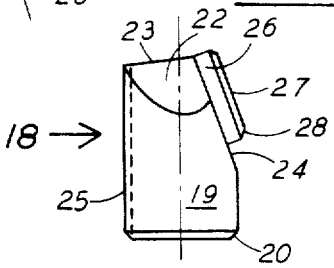
FIG. 5A is a view in side elevation of an alternate embodiment of one of the cutting inserts.
Figure 7:
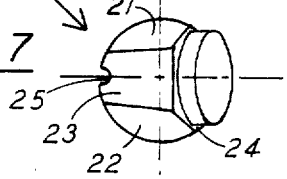
FIG. 7 is a top view of the cutting insert shown in FIG. 5.

Cutting elements 18 are preferably STRATAPAX cutters manufactured by General Electric Company and described in Daniels, et al. U.S. Pat. No. 4,156,329, Rowley, et al. U.S. Pat. No. 4,073,354 and in considerable detail in ADVANCED DRILLING TECHNIQUES by William C. Maurer. The STRATAPAX cutting elements 18 consist of a cylindrical supporting stud 19 of sintered carbide. Stud 19 is beveled at the bottom as indicated at 20, has edge tapered surfaces 21 and 22, a top tapered surface 23 and an angularly oriented supporting surface 24. A small cylindrical groove 25 is provided along one side of supporting stud 19. A disc shaped cutting element 26 is bonded on angular supporting surface 24, preferably by brazing or the like. Disc shaped cutting element 26 is a sintered carbide disc having a cutting surface 27 comprising polycrystalline diamond. In FIG. 5A, there is shown an alternate form of cutting element 18 in which the cutting surface 27 of polycrystalline diamond on disc shaped cutter 26 is beveled around the peripheral edge as indicated at 28.

The relative size of supporting studs 19 of cutting elements 18 and the diameter of recesses 15 are selected so that cutting elements 18 will have a tight interference fit in the recesses 15. The recesses 15 are oriented so that when the cutting elements are properly positioned therein the disc shaped diamond faced cutters 26 will be positioned with the cutting surfaces facing the direction of rotation of the drill bit. When the cutting elements 18 are properly positioned in sockets or recesses 15 the groove 25 in supporting stud 19 is aligned with the small half cylindrical recess 17 on the edge of socket or recess 15. Half cylindrical recess 17 and cylindrical groove 25 in supporting stud 19 together form a cylindrical cavity in which there is positioned a retaining pin 29. Retaining pin 29 is a metal pin of sufficient size that it is retained in the cavity between the groove 25 and recess 17 by an interference fit. This further assists in holding cutting element 18 tightly in the cutting face of the drill bit and prevents rotation or twisting of the cutting element during cutting operation. In FIG. 3, the retaining pin 29 is shown as a relatively short pin terminating flush with the surface of the cutting face in which the cutting element is imbedded. The recess 17 in which pin 29 is inserted is shown as extending only about half the depth of recess 15. This is a preferred arrangement although recess 17 can be extended for the entire depth of recess 15 if desired.

Drill bit body 2 is provided with a centrally located nozzle passage 30 and a plurality of equally spaced nozzle passages 31 toward the outer part of the bit body. The nozzle passages 30 and 31 are designed to provide for the flow of drilling fluid, i.e. drilling mud or the like, to keep the bit clear of rock particles and debris as it is operated. The outer nozzle passages 31 are positioned in an outward angle of about 10°–25° relative to the longitudinal axis of the bit body. The central nozzle passage 30 is set an an angle of about 30° relative to the longitudinal axis of the bit body. The outward angle of nozzle passages 31 directs the flow of drilling fluid toward the outside of the bore hole and preferably ejects the drilling fluid at about the peak surface of the crown surface on which the cutting inserts are mounted. This arrangement provides a superior cleaning action for removal of rock particles and debris from the cutting area when the drill bit is being operated.

The central nozzle passage 30 comprises passage 32 extending from drill body cavity 6 and has a counterbore 33 cut therein. Counterbore 33 is provided with a peripheral groove 34 in which there is positioned an O-ring 35. A cylindrical nozzle insert member 36 is positioned in counterbore 33 and has a passage 37 providing a nozzle for discharge of drilling fluid. Nozzle member 36 is a removable and interchangeable member which may be removed for servicing or replacement or for interchange with a nozzle of a different size or shape, as desired. Nozzle member 36 has a peripheral groove 38 which matches a groove 39 in drill bit body 2. A snap-ring 40 is positioned in grooves 38 and 39 to retain nozzle member 36 in place.

Figure 8:
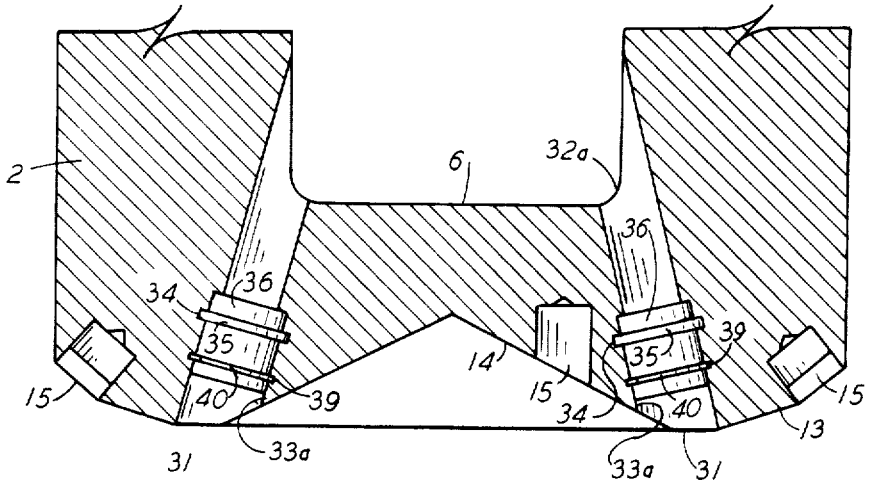
FIG. 8 is a view in section taken on the line 8—8 of FIG. 2.

In FIG. 8, the nozzle passages 31 are shown in some detail but without the nozzle member being in place. In the nozzle passages 31, nozzle passage 32a open from body cavity 6 and is intersected by counterbore 33a. In FIG. 8, nozzle member 36 is shown unsectioned so that only the exterior cylindrical surface is seen. O-ring 35 is seen in full elevation surrounding the outer surface of nozzle member 36 and extending into peripheral groove 34. Likewise, snap-ring 40 is seen in full elevation and fitting into drill bit body groove 39.

Figure 9:
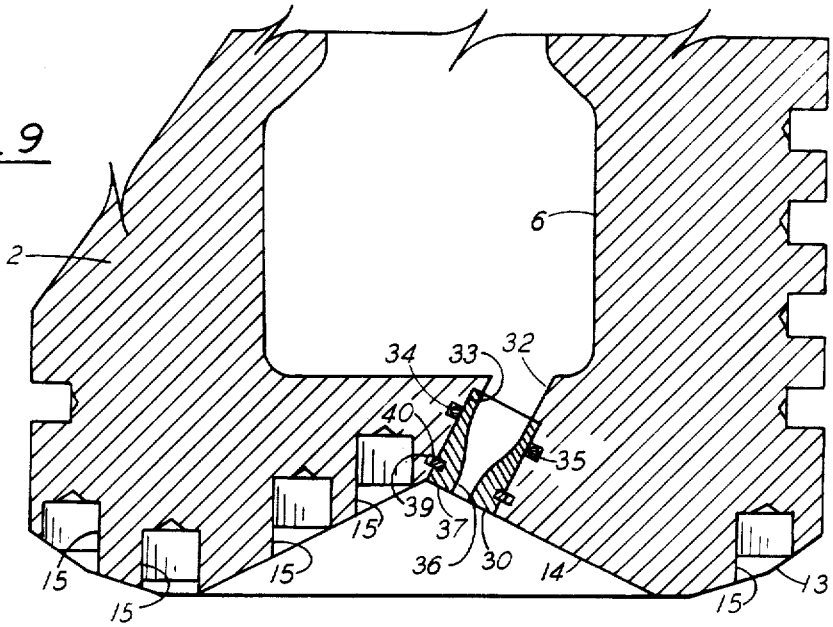
FIG. 9 is a sectional view taken on the line 9—9 of FIG. 2.
Figure 10:
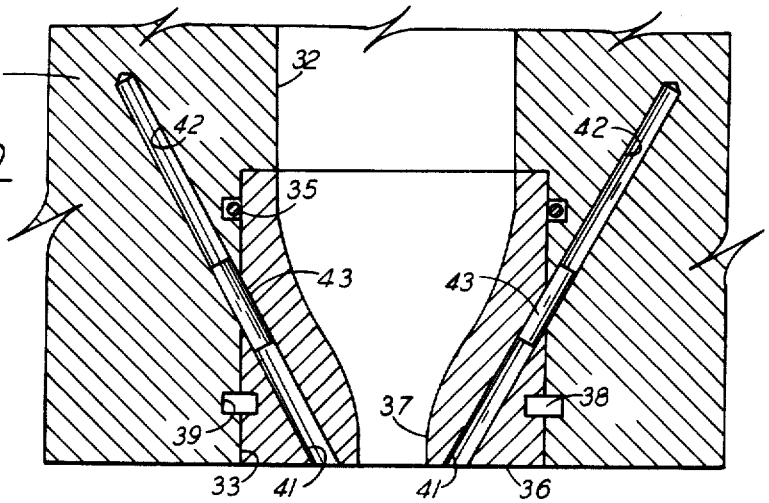
FIG. 10 is a detail, enlarged sectional view of an alternate embodiment of the removable and replaceable nozzle element shown in FIG. 9.

There is a considerable advantage to the use of nozzle members as shown in FIGS. 8 and 9 and particularly at the angles described. The removal and replacement of these members, however, is somewhat difficult when a snap-ring is used for retaining them. In FIG. 10, there is shown an alternate embodiment of the nozzle members which provides for easy removal and replacement or interchange thereof. In FIG. 10, nozzle member 36 is shown positioned in counterbore 33 with O-ring 35 providing the desired seal against leakage. In this embodiment, however, snap-ring 40 is omitted and a continuous hole or passage is provided extending at an angle through nozzle member 36 and into or through bit body 2. This passage consists of angularly extending passage 41 in nozzle member 36 and aligned passage 42 in bit body 2. The passage 41 is preferably formed in the nozzle member 36 at the time of manufacture or fabrication and passage 42 is prepared by placing nozzle member 36 in position and using passage 41 as a guide for drilling passage 42 as aligned passage forming an extension of passage 41. Passage 42 may extend a substantial distance into bit body 2 or, if desired, may extend all the way into cavity 6 in bit body 2. When nozzle 36, in the embodiment shown in FIG. 10, is inserted in place metal pins 43 are inserted therein to a point where they lie partly in passage 41 and partly in passage 42. In this position, nozzle member 36 is held firmly in place. If it is desired or needed to change nozzle member 36, it is necessary only to drive metal pin 43 on into passage 42 to a point where it is no longer projecting into passage 41. At this position, nozzle member 36 can be easily removed. If passage 42 is drilled all the way into cavity 6, metal retaining pins 43 can be driven through into that cavity and recovered. If passage 42 terminates in the bit body, then this system of retaining nozzle member 36 in place is limited to the length of passage 42 in relation to the length of retaining pin 43 which will determine how many of the retaining pins can be driven into passage 42 when several interchanges of nozzle members has taken place. If passage 42 becomes filled with used retaining pins, it will then be necessary to drill out the passage to eliminate the used pins.

OPERATION

The operation of this drill bit should be fairly apparent from the foregoing description of its component parts and method of assembly. Nevertheless, it is useful to restate the operating characteristics of this novel drill bit to make its novel features and advantages clear and understandable.

The drill bit as shown in the drawings and described above is primarily a rotary bit of the type having fixed diamond surfaced cutting inserts. Most of the features described relate only to the construction of a diamond bit. The replaceable nozzle member retaining arrangement, as shown in FIG. 10, is of more general application. This arrangement for retention of the removable and interchangeable nozzle members is useful in a diamond bit as described and shown herein but would also be of like use in providing for the retention of removable and interchangeable nozzle member in roller bits or any other bits which have a flow of drilling fluid through the bit body and out through a flow directing nozzle. The arrangement for releasably securing the nozzle members in place is therefore considered to be of general application and not specifically restricted to the retention of nozzles in diamond cutter insert type bits.

In operation, this drill bit is rotated by a drill string through the connection by means of the drill collar 4 shown in FIG. 1. Diamond surfaced cutting elements 18 cut into the rock or other earth formations as the bit is rotated and the rock particles and other debris is continuously flushed by drilling fluid which flows through the drill string and the interior passage 5 of the drill bit and is ejected through nozzle passages 30 and 31 as previously described. The central nozzle 30 is set at an angle of about 30° to flush away cuttings and debris from the inside of the cutting crown. The outer nozzle passages 31 are set at an angle of 10°–25° outward relative to the longitudinal axis of the drill bit body. These nozzle passages emerge through the cutting face at about the peak of the crown cutting surface. This causes the drilling fluid to be ejected toward the edges of the bore hole and assists in flushing rock particles and cuttings and debris away from the cutting surface. As noted above in the description of construction and assembly, the nozzle passages 30 and 31 are formed by removable nozzle members which may be held in place either by snap-ring 40, as shown in FIG. 9, or by the angularly oriented retaining pins 43 in passages 41 and 42.

The peripheral surface or stabilizer surface 8 of drill bit body 2 is provided with a plurality of sintered carbide cylindrical inserts 12 positioned in sockets or recesses 11 thereof. These inserts protect stabilizer surface 8 against excessive wear and assist in keeping the bore hole to proper gage to prevent the drill bit from binding in the hole. The grooves or courses 10 in stabilizer surface 8 provide for circulation of drilling fluid, i.e. drilling mud, past the drill bit body 2 to remove rock cuttings and debris to the surface.

As previously pointed out, the construction and arrangement of the cutting elements and the method of assembly and retention of these elements is especially important to the operation of this drill bit. The drill bit is designed to cut through very hard rock and is subjected to very substantial stresses. Typical cutting elements 18 are STRATAPAX cutting elements manufactured by General Electric Company and consist of diamond surfaced cutting discs supported on carbide studs as described above. The counterbore 16 adjacent to the socket or recess 15 in which cutting element stud 19 is fitted allows for cutting disc 26 to be partially recessed below the surface of the cutting face of the drill bit and also provides for relieving the stress on the drill bit during the cutting operation. The use of retaining pin 29, which is inserted into the cavity defined by passage 17 and groove 25 provides a further interference fit assisting in retaining cutting element 18 in position and protecting it against twisting movement during cutting operation off the drill bit. The arrangement of cutting elements 18 in a spiral pattern on the crown cutting surface, as shown in FIG. 2, provides for a uniform cutting action on the bottom of the bore hole. The cutters 18 which lie on the outer conical cutting surface 15 function to cut the gage of the bore hole and these cutters together with the carbide inserts 12 in the stabilizer surface 8 function to hold the side walls of the bore hole to proper gage and prevent binding of the drill bit in the bore hole.

While this invention has been described fully and completely with specmal emphasis upon a single preferred embodiment with a few alternate features, it should be understood that within the scope of the appended claims the invention may be practiced otherwise than as specifically described herein.

I claim:

1. A drill bit comprising a drill body having a hollow tubular body adapted to be connected to a drill string, said drill body having an exterior peripheral stabilizer surface and an end cutting face, said end cutting face having a plurality of cylindrical recesses spaced therearound in a selected pattern, each of said recesses having an offset cylindrical counterbore extending for a depth of a fraction of the depth of the adjacent recess, a plurality of cutting elements, one for each of said recesses, said cutting elements each comprising a cylindrical supporting stud of sintered carbide having an angularly oriented supporting surface with a disc shaped element bonded thereon comprising a sintered carbide disc having a cutting surface comprising polycrystalline diamond, said disc shaped elements on said cutting elements have a peripheral bevel on said diamond cutting surface, each of said cutting elements being positioned in one of said recesses by an interference fit with said disc shaped element partially recessed in said counterbore, said counterbores being positioned to orient said discs with their cutting surfaces facing the direction of rotation of the bit and being of a size relieving stresses on said supporting studs during cutting operation.

2. A drill bit according to claim 1 in which said cutting elements each have a groove extending longitudinally for the length of said supporting studs, said cutting face having a plurality of smaller recesses, one for each of said first named recesses, extending parallel to and intersecting each of said recesses, said smaller recesses being of a size defining a cylindrical cavity when said studs are positioned in said first named recesses with said grooves adjacent thereto, and a metal pin having an interference fit in each of said cavities securing said studs in position against twisting movement.

3. A drill bit according to claim 2 in which said metal pins are of a length terminating flush with the surface of said cutting face.

4. A drill bit according to claim 3 in which said smaller recesses extend for only part of the depth of said first named recesses.

5. A drill bit according to claim 1 in which said drill body includes a plurality of longitudinally extending courses in said stabilizer surface permitting flow of drilling fluid thereby, and said stabilizer surface having a plurality of recesses therein and flat ended cylindrical sintered carbide inserts positioned therein.

6. A drill bit according to claim 1 in which said cutting face comprises a crown surface defined by the intersection of an outer conical surface and an inner negative conical surface, and said first named recesses being spaced in a selected pattern along both of said conical surfaces.

7. A drill bit according to claim 6 in which said first named recesses are positioned on said cutting face arranged at least partially in a spiral pattern.

8. A drill bit according to claim 1 in which said drill bit body has a plurality of longitudinally extending nozzle passages extending from the interior of said body through said cutting face at an angle of about 10°–25° relative to the longitudinal axis of said body.

9. A drill bit according to claim 8 in which said nozzle passages each comprises a passage in said drill bit body and a removable nozzle member positioned therein.

10. A drill bit according to claim 6 in which said drill bit body has a plurality of longitudinally extending nozzle passages extending from the interior of said body through said cutting face at an angle of about 10°–25° relative to the longitudinal axis of said body.

11. A drill bit according to claim 10 in which said nozzle passage each comprises a passage in said drill bit body and a removable nozzle member positioned therein.

12. A drill bit according to claim 9 in which said nozzle passage includes a peripherally extending groove, said nozzle member includes a peripherally extending groove in the outer surface thereof and aligned with said nozzle passage groove when installed in said nozzle passage, and a snap ring positioned in said nozzle passage groove and said nozzle member groove securing said nozzle member in position.

13. A drill bit according to claim 9 in which said nozzle member and said drill body include small angularly extending aligned passages when said nozzle member is positioned in said nozzle passage, and a retaining pin fitting said aligned passages to retain said nozzle member in position.

14. A drill bit comprising a drill body having a hollow tubular body adapted to be connected to a drill string, said drill body having an exterior peripheral stabilizer surface and an end cutting face, said end cutting face having a plurality of cylindrical recesses spaced therearund in a selected pattern, a plurality of cutting elements, one for each of said recesses, said cutting elements each comprising a cylindrical supporting stud of sintered carbide having an angularly oriented supporting surface with a disc shaped element bonded thereon comprising a sintered carbide dischaving a cutting surface comprising plycrystalline diamond, each of said cutting elements being positioned in one of said recesses by an interference fit, said discs being positioned with their cutting surfaces facing the direction of rotation of the bit, said drill body having a plurality of nozzle passages extending from the interior of said body through said cutting face, said nozzle passages each comprising a passage in said drill bit body and a removable nozzle member positioned therein, said nozzle member and said drill body including small angularly extending aligned passages when nozzle member is positioned in said nozzle passage, a retaining pin fitting said aligned passages to retain said nozzle member in position, and p1 said angularly extending passage in said drill body and said retaining pin are of predetermined respective lengths such that said pin may be driven completely into said drill body to permit removal of said nozzle member therefrom for replacement or interchange.

15. A drill bit comprising a drill body having a hollow tubular body adapted to be connected to a drill string, said drill body having an exterior peripheral stabilizer surface and an end face with cutting means positioned thereon, said drill body having a plurality of nozzle passages extending from the interior of said body through said end face, said nozzle passages each comprising a passage in said drill bit body and a removable nozzle member positioned therein, said nozzle member and said drill body including small angularly extending passages aligned shen said nozzle member is positioned in said nozzle passage, a retaining pin fitting said aligned passages to retain said nozzle member in position, and said angularly extending passage in said drill body and said retaining pin are of predetermined respective lengths such that said pin may be driven completely into said drill body or the interior cavity thereof to permit removal of said nozzle member therefrom for replacement or interchange.

16. A drill bit comprising a drill body having a hollow tubular body adapted to be connected to a drill string, said drill body having an exterior peripheral stabilizer surface and an end cutting face, said end cutting face having a plurality of cylindrical recesses spaced therearound in a selected pattern, each of said recesses having an offset cylindrical counterbore extending for a depth of a fraction of the depth of the adjacent recess, a plurality of cutting elements, one for each of said recesses, said cutting elements each comprising a cylindrical supporting stud of sintered carbide having an angularly oriented supporting surface with a disc shaped element bonded thereon comprising a sintered carbide disc having a cutting surface comprising polycrystalline diamond, each of said cutting elements being positioned in one of said recesses by an interference fit with said disc shaped element partially recessed in said counterbore, said counterbores being positioned to orient said discs with their cutting surfaces facing the direction of rotation of the bit and being of a size relieving stresses on said supporting studs during cutting operation, said drill bit body having a plurality of longitudinally extending nozzle passages extending from the interior of said body through said cutting face at an angle of about 10°-25° relative to the longitudinal axis of said body, said nozzle passages each comprises a passage in said drill bit body and a removable nozzle member positioned therein, said nozzle passage includes a peripherally extending groove, said nozzle member includes a peripherally extending groove in the outer surface thereof and aligned with said nozzle passage groove when installed in said nozzle passage, a snap ring positioned in said nozzle passage groove and said nozzle member groove securing said nozzle member in position, said nozzle member and said drill body include small angularly extending aligned passages when said nozzle member is positioned in said nozzle passage, and a retaining pin fitting said aligned passages to retain said nozzle member in position, and said angularly extending passage in said drill body and said retaining pin are of predetermined respective lengths such that said pin may be driven completely into said drill body to permit removal of said nozzle member therefrom for replacement or interchange.

*17. A drill bit comprising*

*a drill body having a hollow tubular body adapted to be connected to a drill string,*

*said drill body having an exterior peripheral stabilizer surface and an end cutting face,*

*said end cutting face having a plurality of cylindrical recesses spaced therearound in a selected pattern,*

*a plurality of cutting elements, one for each of said recesses,*

*said cutting elements each comprising a cylindrical supporting stud of sintered carbide having an angularly oriented supporting surface with a disc-shaped element bonded thereon comprising a sintered carbide disc having a cutting surface comprising polycrystalline diamond,*

*said disc-shaped elements on said cutting elements have a peripheral bevel on said diamond cutting surface, and*

*each of said cutting elements being positioned in one of said recesses by an interference fit.*

*18. A cutting element for use in a drill bit of the type comprising a drill body and recess means therein for receiving said cutting element, said cutting element comprising a cylindrical supporting stud of sintered carbide having an angularly oriented supporting surface with a disc-shaped element bonded thereon comprising a sintered carbide disc having a cutting surface comprising a polycrystalline diamond, said disc-shaped element on said cutting element having a peripheral bevel on said diamond cutting surface.*

* * * * *